A. FAY.
APPARATUS FOR OPERATING UPON COMPOSITE SUBSTANCES.
APPLICATION FILED SEPT. 14, 1916.

1,202,692.

Patented Oct. 24, 1916.
3 SHEETS—SHEET 1.

Witnesses:
Inventor

A. FAY.
APPARATUS FOR OPERATING UPON COMPOSITE SUBSTANCES.
APPLICATION FILED SEPT. 14, 1916.
1,202,692.
Patented Oct. 24, 1916.
3 SHEETS—SHEET 2.
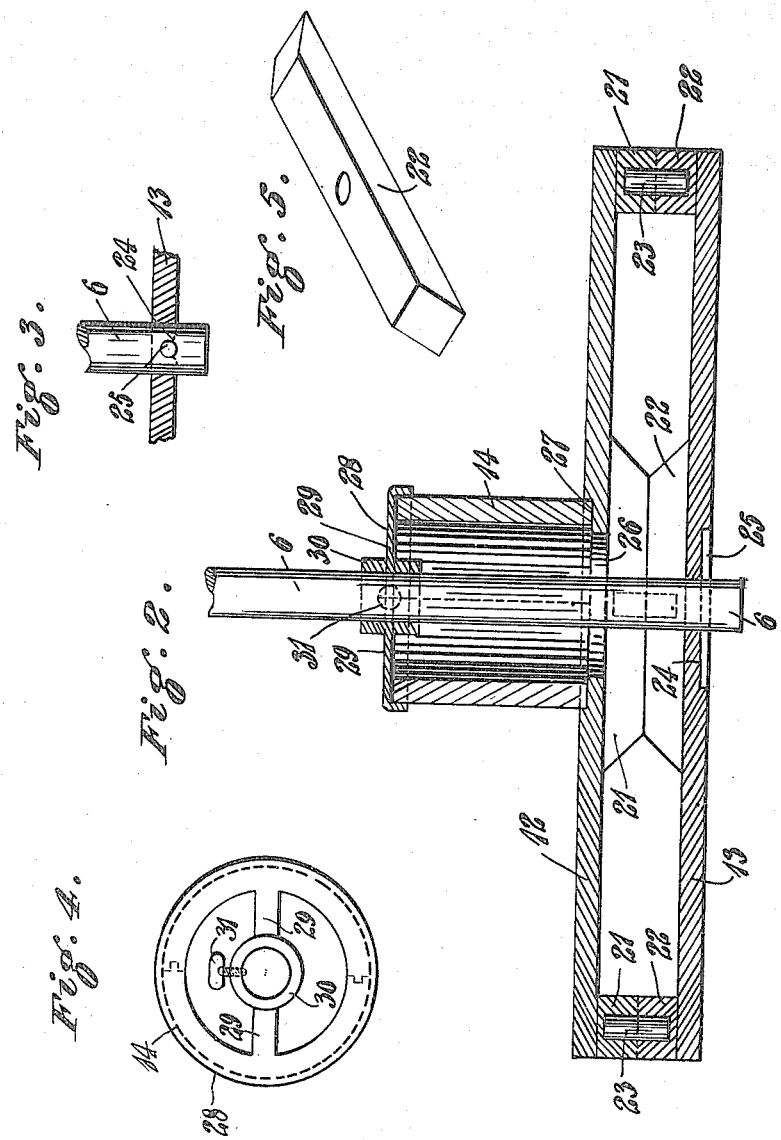

UNITED STATES PATENT OFFICE.

ALPHEUS FAY, OF LOUISVILLE, KENTUCKY.

APPARATUS FOR OPERATING UPON COMPOSITE SUBSTANCES.

1,202,692.

Specification of Letters Patent.

Patented Oct. 24, 1916.

Application filed September 14, 1916. Serial No. 120,173.

*To all whom it may concern:*

Be it known that I, ALPHEUS FAY, a citizen of the United States, and a resident of Louisville, in the county of Jefferson and State of Kentucky, have invented a certain new and useful Apparatus for Operating upon Composite Substances, of which the following is a specification.

The object of my invention is to provide a novel method and means to operate upon a comparatively broad shallow body of a composite substance containing butter fat, with the vertical pressure, peripheral pressure and the peripheral surface of said body minimized; and the upper surface, the lower surface and the peripheral diameter of said body maximized to allow said body to partake freely of undulatory movement by rotatable members with their thickness and their peripheral surfaces minimized and their upper surfaces and lower surfaces and diameter maximized; with the peripheries of said members moving in close proximity with the inside walls of said vessel, the distance from the center to the periphery of said members being greater than the distance from the peripheries of the said members to the inside walls of said vessel; said members rotating said body in the same direction as said members but at a slow velocity compared with the velocity of said members, said vessel having its walls converged with a broad width and a shallow depth to allow the substance in the vessel to rise and fall freely to be acted upon to produce mechanical and chemical changes through its rates of vibrations in the substances, until the cream elements coincidently change into binominal quantities.

A further object of my invention is to simplify the construction of apparatus of the above character, thereby making it more economical of production; and also to make the apparatus readily disassembled for storage and shipping; and to make each part so that when it is detached from the other parts it will very readily be cleaned, so that the entire apparatus may be kept thoroughly sanitary in use.

My invention consists in the apparatus and the parts thereof, and in the details of construction and arrangement of such parts, as will hereinafter be more fully described and claimed.

Figure 1:
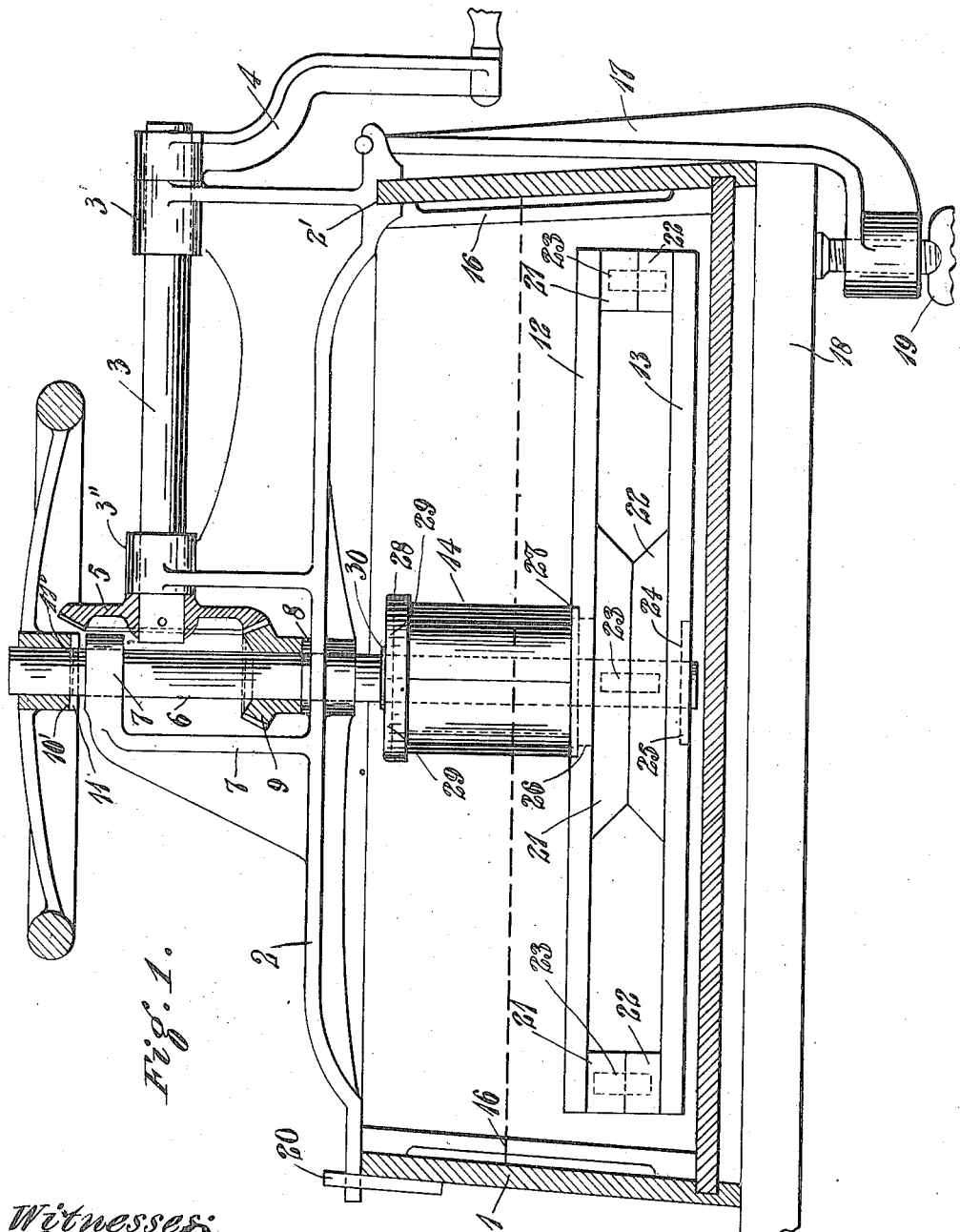
Figure 6:
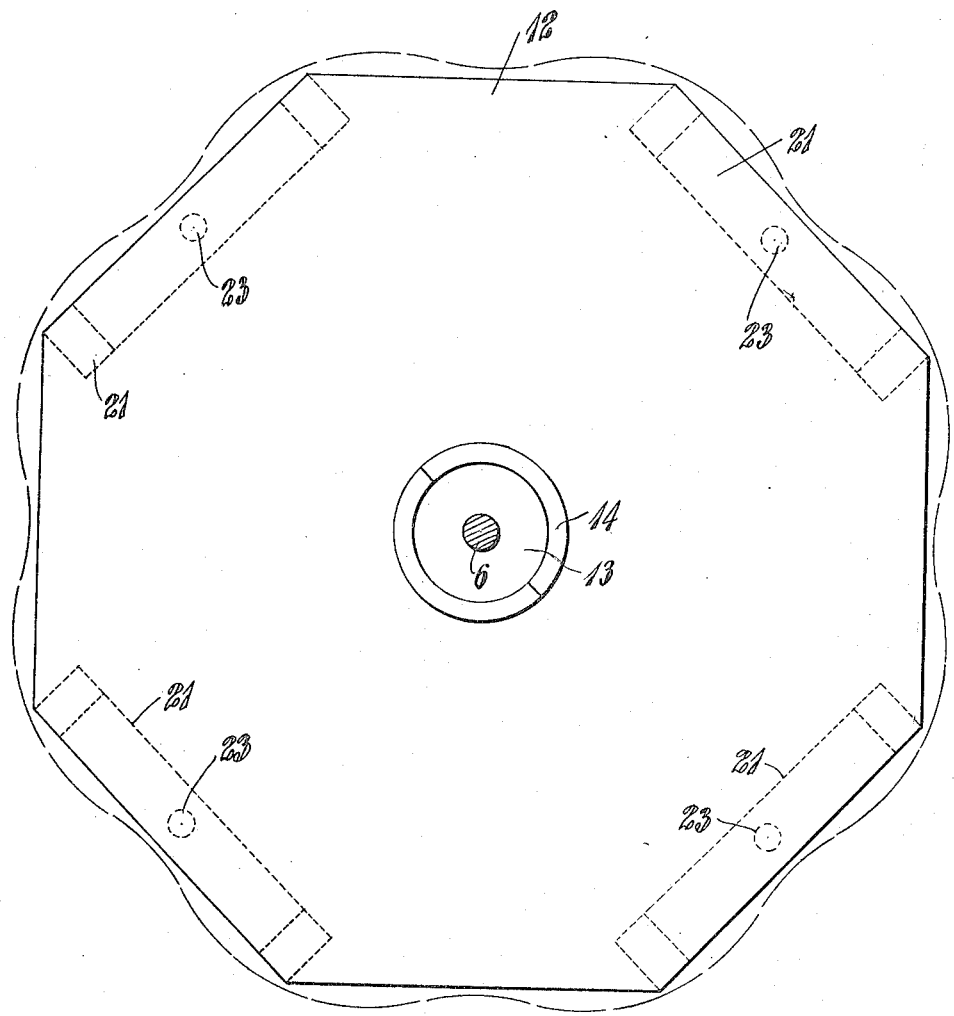

In the drawing: Figure 1 is a vertical cross-section of an apparatus embodying my invention, but with the impeller and its shafts shown in elevation; Fig. 2 is a vertical cross-section of the impeller and its hollow shaft; Fig. 3 is a fragmentary sectional view of the central part of the lower impeller member and solid shaft, showing how the pin holds them together; Fig. 4 is a plan view of the cap on the top of the hollow shaft; Fig. 5 is a detail perspective view of one of the bearing blocks removed from its impeller member; and Fig. 6 is a plan view of the impeller.

The vessel 1 for containing milk elements to be operated upon is of wide and low formation providing an ample base, so that the vessel is readily secured in a substantial manner to a table or other supporting means. The wide and low formation of the vessel in addition to providing a firm foundation therefor, prevents the substance operated upon therein from becoming deep in proportion to its diameter. Keeping the depth of the substance shallow in proportion to its diameter is a very important feature in the satisfactory operation of my apparatus, and for that reason I make my vessel for containing a substance to be operated upon of a wide and low formation, namely, the diameter being greater than its depth. This is according to the method set forth and claimed in my co-pending applications, Serial No. 744,158, filed Jan. 25, 1913, Serial No. 829,982, filed April 6, 1914, and Serial No. 11,355, filed March 1, 1915.

The bracket 2 is mounted across the top of the vessel and secured to the rim thereof as will be more particularly described hereinafter. A shaft 3 is journaled horizontally in the bracket and has a crank 4 fixed on it outside of the bracket. This shaft has a bearing 3' next to the crank 4, and over near the middle of the bracket has another bearing 3'', and its end part has fixed on it next to the bearing 3'' a bevel gear 5. The solid shaft 6 is mounted vertically and extends down into the vessel, having an upper bearing 7 and a lower bearing 8. The lower bearing 8 is in the middle of the main part of bracket 2, but the upper bearing 7 is on the top of an upwardly extending arm 7' which the bracket 2 has on the side of the shaft 6 opposite from the bearing 3''. A bevel pinion 9 is fixed on the solid shaft 6 and meshes with the bevel gear 5. This construction of the bracket and combination thereof with the gear 5 is very compact, yet substantial, and affords protection against the catching of objects between the gear and the pinion.

The lower side of the hub of the fly wheel 10 has radial grooves 10′, and the shaft 6 has an opening with a pin 11 passing transversely through it, which pin has on one side a recess 11′. When the pin is passed through the opening and lies within the grooves 10′ of the fly wheel, and the fly wheel bears downwardly upon the pin, the recess 11′ will pass down over the sides of the shaft adjacent to the opening therethrough, so that the ends of the recess engaging with the sides of the shaft will prevent the pin from sliding laterally out from its position in the shaft, while the engagement of the pin in the grooves of the fly wheel will cause the fly wheel to rotate with the shaft. Such a method of fastening the fly wheel to the shaft is superior to the use of a set screw, because it does not interfere with the centering of the wheel on the shaft. This construction is disclosed and claimed in my co-pending application, Serial No. 11,352, filed March 1, 1915.

The shaft 6 extends down into the vessel 1 and carries an impeller comprising plane polygonal members 12 and 13 above and below, respectively; the upper one, 12, having a hollow shaft 14 surrounding the shaft 6, and the lower one, 13, having suitable means to hold it up on the shaft. This impeller construction will be more fully described and claimed hereinafter. To properly cooperate with the impeller, brakes 16 are mounted in upright position against the opposite walls of the vessel 1, and held down in the vessel by the engagement of the bracket 2 with their upper ends. This bracket 2 has a channel 2′ in the lower side near one end which fits over the rim of the vessel 1; and the clamping member 17 engages with the bracket outside the vessel and extends under the table or other supporting means 18, where it has a clamping screw 19 by which the bracket 2 is held on the vessel 1, and the latter is held down on the supporting means 18. This means is disclosed and claimed in my co-pending application Serial No. 11,353, filed March 1, 1915. The other end of the bracket 2 at the opposite side of the vessel is simply straight and fits into a clip 20 that holds it down on the rim of the vessel.

The upper impeller member 12 is composed of a flat, relatively thin polygonal member, preferably a thin wooden board, with bearing blocks 21 fixed on its lower side along and substantially conterminous with alternate sides of this polygonal part and each preferably having its ends divergently inclined from its bottom up to its junction with the part 12. The impeller member 13 is of similar polygonal shape and proportion with bearing blocks 22 similar to the blocks 21 on the upper side of this lower member along and substantially conterminous with alternate ones of its sides, so that the two members can be brought together inversely, and have the bottoms of the blocks 21 raised on the top of the blocks 22. Preferably, dowel pins 23 fit into registering openings in the respective blocks 21 and 22, maintaining their alinement and preventing rotation of the members 12 and 13 relatively to each other.

The lower impeller member 13 has radial grooves 24 in its lower side, and the lower end part of the shaft 6 has a transverse opening through which passes a pin 25 that fits up into the groove when the member 13 is slipped down on the shaft 6 as disclosed and claimed in my co-pending application, Serial No. 69,885, filed January 3, 1916.

The upper impeller member 12 has down through it an opening 26 with an annular depressed part 27 around it receiving the lower end of the hollow shaft 14, which is preferably also made of wood in two semi-cylindrical sections, with their lower ends held together by the walls of the depression 27, and with their upper ends held together by a cap 28 that fits down over them but has its central part open except for two opposite radially outwardly extending arms 29, which are connected to a hub 30 fitting around the shaft 6, and having a set screw 31 that thus clamps the cap down on the top of the hollow shaft. Thus the lower impeller 13, upper impeller member 12 and hollow shaft 14 are all clamped tightly together between the pin 25 in the lower part of the shaft 6 and the cap 28 above. They are thus caused to turn with the shaft 6, but are readily disassembled therefrom and from each other, to allow them to be readily cleaned, so that the entire interior of the apparatus may readily be kept in sanitary condition. With the hollow shaft 14 thus provided, if the impeller is rotated it acts centrifugally and centripetally upon the liquid, making contact with the upper and lower surfaces of its upper and lower members, forcing the liquid radially outward between the two members and above them and below them while the periphery will present a substantially V-shaped formation. With the liquid thus impelled outwardly, areas of reduced pressure will be created in the central regions of the impeller, and air will be drawn down through the hollow shaft between the impellers. With the impellers thus formed and operated, the vibrations or undulations in the liquid around the periphery will be somewhat of a serpentine formation.

For separating butter from either sweet or sour cream, the liquid is placed in the vessel to about the height of the heavy dotted line, with the impeller about midway of the depth of the liquid as shown. It is important that the depth of the liquid above the impeller disk be not too great; otherwise the entrance of the air under atmospheric pressure will be hindered. It is also important that the distance between the impeller and the bottom of the vessel be not too great, because any considerable quantity of liquid too far below the impeller will not be affected by the aeration and other forces acting upon it, and will not have the butter separated from it, but will merely serve as a collecting place for the butter separated from the upper liquid. On the other hand it is highly desirable that the impeller disk be of considerable diameter in order to obtain the greatest amount of centrifugal and centripetal action without impact and to operate on as large a quantity of liquid as is desired. For this reason the proper disposition of the body of liquid will be such that its width is considerably greater than its depth, as illustrated in the drawing, and it is for this reason that the vessel is made wide and low so that it is possible for all the forces applied to the liquid to act upon it in a uniform manner. The milk elements should not have their temperature too low or too high, about 55° or 60° Fahrenheit being the preferred temperature. Such temperature is high enough to allow the operation to be performed quickly, and it is not so high as to cause the resulting butter granules to be too soft. With this method butter may be produced within from three to ten minutes. Perceptible accumulation of butter will practically all take place during the last 15 or 60 seconds of the operation. The butter will form in granules, and then the residue may be drawn off from the vessel and the granules salted by agitation and aeration of brine with the granules in the vessel. When the salting operation is completed, the butter granules may be removed from the brine in the vessel, or the brine may be withdrawn from the butter granules, and the granules then removed from the vessel, after which the granules are worked or pressed into consistency for use. The efficiency of operation is such that fully 90% of the butter fat of the cream is removed, and butter of purity of over 99% is obtainable, of firm texture and natural flavor.

Having fully described my invention, what I claim as new and desire to secure by Letters Patent is:

1. In apparatus for operating upon composite substances, a vessel, an impeller in said vessel comprising upper and lower flat, polygonal members with plane upper and lower surfaces, and bearing blocks secured, respectively, to the lower and upper surfaces of said members along and conterminous with alternate ones of the sides of said members, and having ends convergently inclined from said surfaces, whereby, when said members are held together substantially concentric, said bearing blocks meet and form alternate closed and polygonal open sides to the impeller, means for supplying air down to the space between said members, means for holding said members together as aforesaid, and means for supporting and rotating said impeller in said vessel.

2. In apparatus for operating upon composite substances, a vessel, an impeller in said vessel comprising upper and lower flat members with plane upper and lower surfaces, and bearing blocks secured, respectively, to the lower and upper surfaces of said members along their peripheries in spaced apart relation, whereby, when said members are held together substantially concentric, said bearing blocks meet and form alternate closed and open sides to the impeller, pins extending into the meeting bearing blocks, means for supplying air down to the space between said members, means for holding said members together as aforesaid, and means for supporting and rotating said impeller in said vessel.

3. In apparatus for operating upon composite substances, a vessel, an impeller in said vessel comprising upper and lower flat, polygonal members with plane upper and lower surfaces, and bearing blocks secured, respectively, to the lower and upper surfaces of said members along and conterminous with alternate ones of the sides of said members, and having ends convergently inclined from said surfaces, whereby, when said members are held together substantially concentric, said bearing blocks meet and form alternate closed and polygonal open sides to the impeller, pins extending into the meeting bearing blocks, means for supplying air down to the space between said members, means for holding said members together as aforesaid, and means for supporting and rotating said impeller in said vessel.

ALPHEUS FAY.

Witnesses:
CLARENCE PERDUE,
EDITH LOICHINGER.

Copies of this patent may be obtained for five cents each, by addressing the "Commissioner of Patents, Washington, D. C."